United States Patent [19]

Davisson

[11] Patent Number: 4,791,973
[45] Date of Patent: Dec. 20, 1988

[54] REINFORCING PLIES FOR TIRES

[75] Inventor: Jack A. Davisson, Luxembourg, Luxembourg

[73] Assignee: The Goodyear Tire & Rubber Company, Akron, Ohio

[21] Appl. No.: 148,264

[22] Filed: Jan. 25, 1988

[30] Foreign Application Priority Data

Apr. 14, 1987 [GB] United Kingdom ................. 8708977

[51] Int. Cl.⁴ ............................................. B60C 9/18
[52] U.S. Cl. .................................... 152/526; 152/531; 152/536
[58] Field of Search ............... 152/526, 527, 531, 535, 152/536, 538, 533

[56] References Cited

U.S. PATENT DOCUMENTS

| | | | |
|---|---|---|---|
| 1,894,237 | 1/1933 | Mallory | 152/535 |
| 2,945,525 | 7/1960 | Lugli | 152/533 |
| 3,077,915 | 2/1963 | Weber | 152/536 X |
| 3,095,026 | 6/1963 | Weber | 152/458 |
| 3,396,072 | 8/1968 | Wolfe | 428/493 |
| 3,570,574 | 3/1971 | Marker et al. | 152/527 |
| 3,667,529 | 6/1972 | Mirtain et al. | 152/527 |
| 3,850,219 | 11/1974 | Snyder | 152/531 |
| 3,990,493 | 11/1976 | Caretta | 152/526 |
| 4,325,423 | 4/1982 | Seitz et al. | 152/526 |

FOREIGN PATENT DOCUMENTS

| | | |
|---|---|---|
| 889677 | 1/1972 | Canada . |
| 1008761 | 4/1977 | Canada . |
| 1091890 | 10/1960 | Fed. Rep. of Germany . |
| 2821093 | 11/1979 | Fed. Rep. of Germany . |
| 2824357 | 12/1979 | Fed. Rep. of Germany . |
| 956003 | 4/1964 | United Kingdom . |
| 2108439 | 5/1983 | United Kingdom . |

Primary Examiner—Michael W. Ball
Assistant Examiner—Ramon R. Hoch
Attorney, Agent, or Firm—L. R. Drayer

[57] ABSTRACT

A radial carcass, belted tire (10) comprises an overlay ply (18) which provides the tire with high speed endurance without adversely affecting the uniformity of the tire. The overlay ply (18) comprises textile reinforcing elements consisting of successively aligned cord sections (21) arranged in parallel rows. Each cord section has a length which is comprised between $\frac{1}{4}$ and $\frac{1}{2}$ of the corresponding circumferential development of the tire. The cord sections (21) in each row have substantially equal length and are separated by interruptions (22) of a width such that the total width of the interruptions per circumferentially extending row of cords is less than 4% of the corresponding circumferential development of the tire.

11 Claims, 4 Drawing Sheets

REINFORCING PLIES FOR TIRES

DESCRIPTION OF THE INVENTION

The present invention relates to a pneumatic tire comprising a radial ply carcass, a tread disposed radially outwardly of the crown region of the carcass, a belt interposed between the tread portion and the crown region of the carcass in circumferential surrounding relation to the carcass, whereby the belt includes at least two plies, each of which comprises cords of high modulus material extending parallel to one another in each belt ply, and making opposed angles with respect to the mid-circumferential plane of the tire, whereby each of the belt plies has a respective width approximately equal to that of the tread and an overlay ply comprising at least one layer of textile reinforcing elements which are substantially parallel to one another and to the mid-circumferential plane of the tire.

Tires comprising such crown reinforcements have been found to be particularly durable when subjected to high revolution speeds. The overlay ply can, for example, be interposed between the radially outermost belt ply and the tread and consist of a single ply having a width which is about equal to that of the widest of the belt plies. Alternatively, the overlay ply can consist of two separate axially spaced apart ply portions either disposed radially outwardly of the belt such as to cover the edges of the radially outermost belt ply or interposed between the belt plies such as to extend between the edges thereof.

In the following description the overlay ply will be described in terms of a single ply disposed between the belt and the tread, but it will become apparent to a person skilled in the art that problems encountered in the prior art with single overlay plies and the solutions that the present invention presents thereto equally apply to overlay plies consisting of two or more portions as described above.

The overlay ply is usually applied onto the green tire as a single annular layer around the belt with the two end portions of the ply slightly overlapping to form a splice. However, as a result of the expansion of the tire in the curing mold and as a result of the thermal contraction of the textile filaments, the stresses in the cords of the ply are non-uniformly distributed around the circumference of the tire and slippage between the overlay ply end portions tends to occur at their overlap region. This slippage at the overlap region of the overlay ply generally produces an undesired distortion on the underlying belts. This in turn can result in an unbalanced portion in the tire and a reduction in tire uniformity.

It has been proposed in the prior art, to distribute the nonuniformity introduced by the overlay splice over a wider range of the tire circumference and the overlapping area of the overlay ply has been arranged e.g. at an angle of between 30° and 45° to the circumferential direction of the tire, or even at a higher angle (see e.g. LU-A-85964). While this configuration has resulted in a substantial reduction of the distortion of the belt, it has not resulted in a complete elimination thereof.

U.S. Pat. No. 4,325,423 has further proposed to reduce the negative effect on the belts caused by the slippage at the overlap by using an overlap area of a generally zigzag or wavy form extending across the width of the overlay ply. However, the nonuniformity in the stress distribution of the overlay cords still remains localized over a relatively small portion of the circumference of the tire and belt distortion cannot be completely avoided in that portion.

It has also been proposed in the prior art to use overlay plies comprising several circumferentially spaced overlapping sections, thereby allowing the stresses in the cords to be taken up by the overlap portions which are spaced around the circumference of the tire (see e.g. DE-A-2 824 357 and DE-A-2 821 093). However, this solution is costly from a manufacturing point of view as it requires the single turn overlay to be preassembled from several smaller sections.

It has further been proposed in the prior art, e.g. U.S. Pat. No. 4,284,117, to use single yarn reinforcing cords for the overlay ply and to wrap several turns of this layer around the circumference of the tire thereby virtually eliminating the possibility of any slippage of the overlay ply in the final tire. Since the ply itself cannot accommodate the expansion of the belt through slippage, the expansion is entirely taken up by the reinforcing yarns which to this effect have a relatively low modulus of elongation as compared to the cords used in single layer overlay plies.

It is an object of the present invention to provide a pneumatic tire which is durable at high speeds and which at the same time has a high degree of uniformity.

It is a further object of the invention to provide a tire which can be manufactured in a cost-effective manner and which employs overlay plies comprising reinforcement cords with a relatively high modulus of elongation.

The present invention is characterized in that the textile reinforcing elements of the overlay ply consist of successively aligned cord sections arranged in parallel rows each having a length which is comprised between $\frac{1}{4}$ and $\frac{1}{8}$ of the corresponding circumferential development of the tire, the cord sections in each row having substantially equal length, and being separated by interruptions of a width such that the total width of the interruptions per circumferentially extending row of cords is less than 4% of the corresponding circumferential development of the tire.

By corresponding circumferential development of the tire is meant throughout this specification the circumference of the overlay ply at the mid-circumferential plane when the tire is mounted on its corresponding rim and inflated to its design pressure, but not subjected to a load.

It is to be noted that U.S. Pat. No. 3,990,493 describes an overlay ply in a radial tire which comprises interruptions or cuts which are regularly spaced around the circumference. However, the discontinuous cord portions have a length which is not greater than 1/10 of the corresponding circumferential development of the tire and is preferably comprised between 1/100 and 4/100 of the corresponding circumferential development of the tire. The object of the invention is to provide a tire which has a high riding comfort.

It is further to be noted that U.S. Pat. No. 2,945,525 describes an annular layer comprising ring shaped reinforcing elements which have at least one interruption for each complete circumference of the tire. The layer described in this patent is a belt layer which is the sole reinforcement of the crown area of the tire and fulfills the function of the belt which is completely different from the function fulfilled by the overlay ply of the present invention.

The invention will now be illustrated with reference to the accompanying drawings in which.

Figure 1:
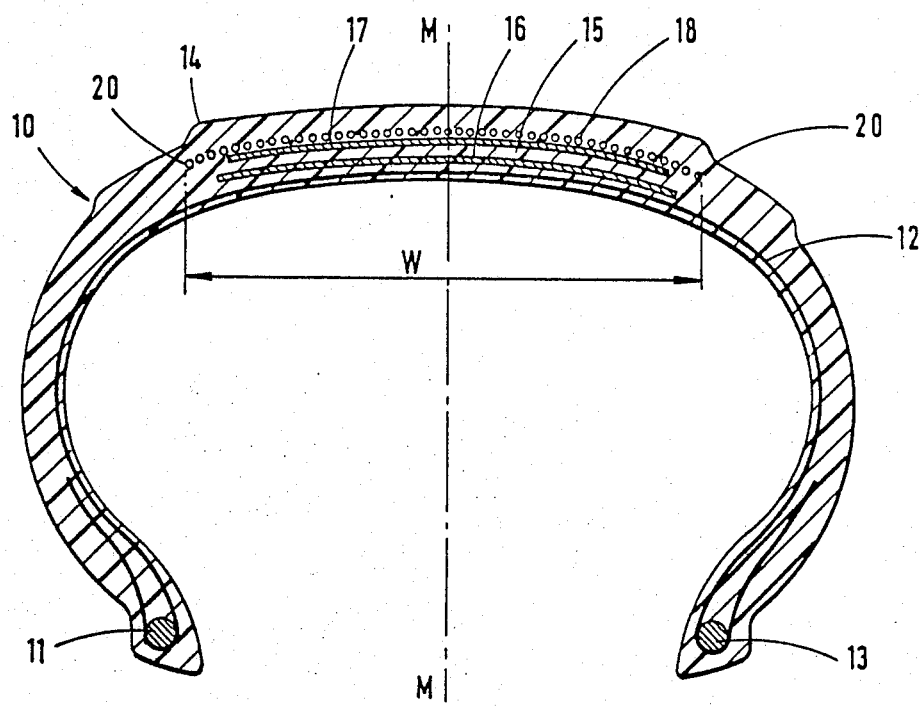
FIG. 1 is a schematic representation of a radial section through a tire showing the crown reinforcement of a tire according to the present invention.

With reference to FIG. 1 there is illustrated a radial carcass pneumatic tire 10. The tire 10 comprises a pair o annular beads 11 and 13 with a radial carcass ply 12 extending from one bead 11 to the other bead 13. The cords of the carcass ply are substantially parallel to each other and extend from bead to bead so as to make an angle with the mid-circumferential plane M-M of between 80° and 90°. By "mid-circumferential plane" is meant a plane perpendicular to the axis of rotation of the tire and which is located midway between the beads 11 and 13. The cords of the carcass ply 12 can be made of any suitable material, for example, rayon, steel, polyester, polyamide or aromatic polyamide.

The crown area 14 of the tire is reinforced by a belt assembly 15 located radially outwardly of the carcass ply 12 and which extends circumferentially around the tire. The belt assembly comprises two concentric breaker belts 16 and 17, each of which comprises an elastomeric ply reinforced by steel cords or other known suitable material, for example, glass fiber or aromatic polyamide. Within each belt the cords are substantially parallel to each other and make an angle of between 15° to 30° with the mid-circumferential plane M-M. The cords of the first belt 16 extend in the diagonally opposite direction to the cords of the second belt 17.

Radially outwardly of the belt assembly 15 is a textile cord reinforced overlay ply 18 having a width W between its lateral edges 20 such that it is at least as wide as the belt assembly 15 so as to completely cover it. The overlay ply 18 is an elastomeric ply, containing cords which extend substantially circumferentially around the tire, that is, they make an angle of between 0° and 5° with the mid-circumferential plane M-M.

Figure 2:
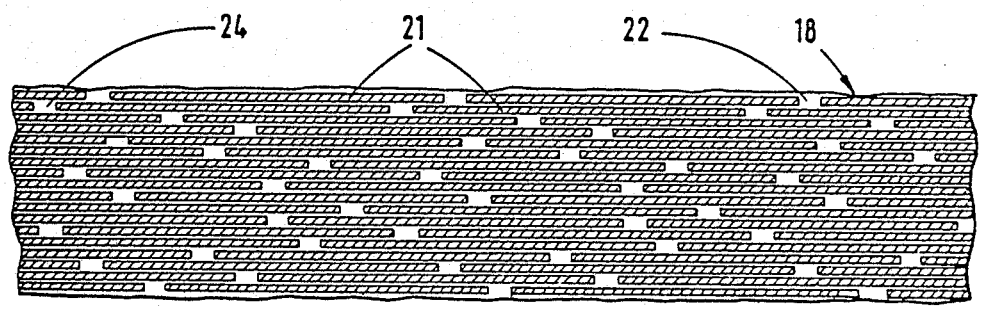
FIG. 2 shows a partial plan view of an overlay ply according to the invention.

FIG. 2, which shows a partial plan view of the overlay ply 18 according to the invention, illustrate more clearly that the overlay ply comprises sections 21 consisting of discontinuous lengths of cords which are embedded in a sheet of a suitable rubber compound. The cord sections 21 in the overlay ply are aligned end to end in a plurality of spaced apart mutually parallel rows. The interruptions 22 between the adjacent ends of any two sections of cord in one row are offset longitudinally with respect to interruptions 24 between cord sections in the immediate adjacent row. In other words, the interruptions in a given row are staggered with respect to the interruptions in an adjacent row.

The spacing of the interruptions in this manner is necessary to ensure a uniform distribution of the reinforcing cord portions around the circumference of the tire.

It is preferred that the disposition of the interruptions of the individual cords in adjacent rows do not follow any regular pattern such as, for example, a constant spacing between the interruptions in the circumferential direction. It is believed that a particularly advantageous construction is obtained when the spacings between the interruptions in adjacent rows are distributed in a random manner. To this effect, random pattern generators, which are well known in the computer art, can be used to derive random sequences for calculating the positions of the interruptions in the circumferential direction.

It is desirable that each of the cord sections contributes with substantially equal strength to help the overlay ply to fulfill its function as a circumferential restrictor ply. It is therefore preferred to use plies with cord sections of substantially equal length in each of the rows as illustrated in FIG. 2. By substantially equal length is meant that the length of the cord sections in each row does not vary by more than about 5% of the average section length.

It may be advantageous to vary the restrictive effect of the overlay ply across the width of the tire such that, for example, the shoulder portions of the tire are more rigid than the center portion of the tire. This can be achieved by providing cord sections in the shoulder portion of the tire which have a length which is larger than the length of the cord sections in the central portion of the tire. Hence, while being of substantially equal length in each circumferential row, the cord sections in each row may decrease in length from the shoulder portions of the tire to the central portion of the tire.

The material for the textile reinforcing elements may be selected from one or more of the conventional materials that are used in tires such as nylon, rayon, aramid, polyester, etc. It is desirable, however, that the reinforcing elements have a relatively high modulus of elongation, i.e. a load capacity greater than 20 Newtons at 4% elongation. The present invention permits the use of high modulus cords since the expansion of the overlay ply during the curing process can be taken up entirely by the gaps between the cord sections. The interruptions or gaps open slightly under the action of the expansion forces and accommodate the change in circumferential length of the overlay ply.

The overlay plies can be made from conventional ply stock containing uncut lengths of cord which may be calendered in the usual manner. The cords are subsequently cut into sections at regularly spaced intervals. This separation of the reinforcing cords into sections may be effected by cutting, punching, grinding, slicing, abrading or a similar process. The cutting operation can take place at the calender itself, prior to winding up the ply material, or just prior to the application of the overlay ply material to the tire at the tire building machine.

From the above description it becomes apparent that the tires of the present invention can be manufactured in a very cost-effective manner. Whereas in prior art manufacturing, a different overlay ply had to be used for each tire size for effectively accommodating the stresses in the ply cords, the present invention allows for a standard overlay ply to be used in a variety of tire sizes. The interruptions that are provided in the cords of the overlay ply of the present invention contribute towards an effective control of the tensions in the overlay ply.

In a conventional manufacturing process it may be advantageous to use one single cut to separate a plurality of continuous reinforcing cords. The cutting device is thereby greatly simplified and the total number of cuts that are made on the ply is considerably reduced.

Figure 3:
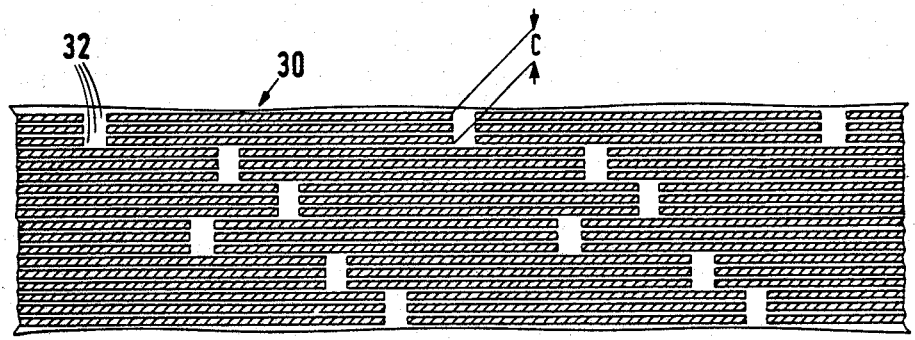
FIGS. 3 and 4 show partial plan views of overlay plies according to preferred embodiments of the present invention.

FIG. 3 illustrates a ply 30 wherein the interruptions 32 of a group of 3 adjacent cord sections lie in the same radial plane. The width of the cut, in other words the width that is occupied by the interruptions of adjacent cords which lie in the same radial plane is indicated in FIG. 3 by the distance C. While the embodiment of FIG. 3 illustrates a plurality of interruptions which lie in the same radial plane, they can equally be disposed in a plane which makes an angle with the radial direction.

As described above in connection with the embodiment of FIG. 2, the interruptions are preferably staggered in the circumferential direction and distributed around the circumference of the tire in an irregular manner.

Applicants have found that the beneficial results of the invention are still obtained when the width C of the cuts in the same radial plane corresponds to about 10% of the width of the overlay ply. This width corresponds to about the width that 20 reinforcing cords occupy in the overlay ply of a large size passenger tire.

The interruptions between the successively aligned cord sections are of negligible width, i.e. the total width of the interruptions per circumferentially extending row of cords is less than about 4% of the circumferential development of the tire.

The invention will now be illustrated by way of an example.

Figure 4:
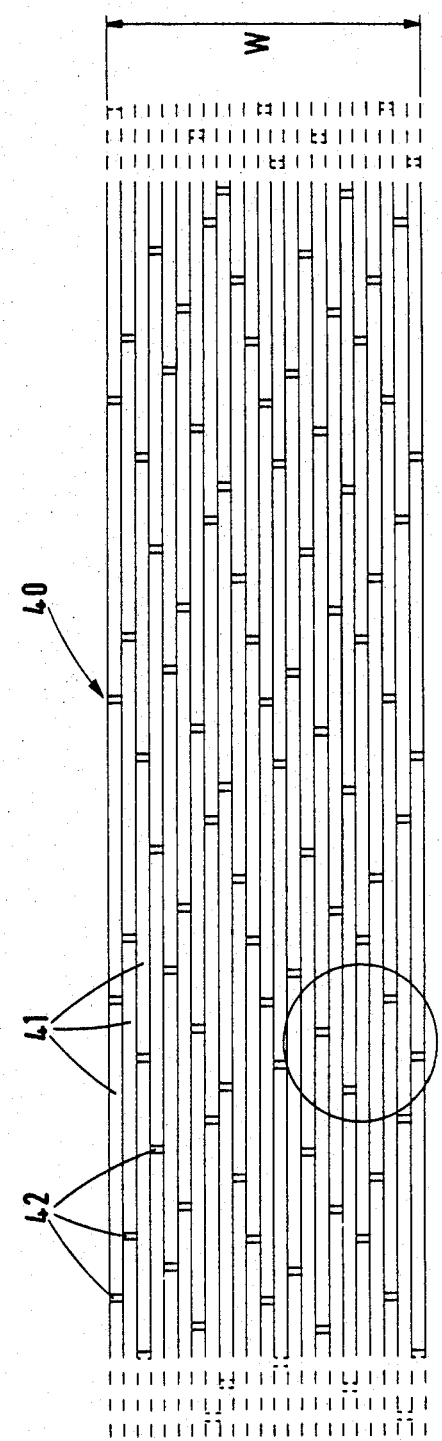

FIG. 4 illustrates a partial plan view of the overlay ply of a tire of size 185/70 R 14:

The width W of the ply 40 is about 140 mm and it contains about 25 rows of reinforcing cord sections 41, per 25 mm (1 inch) of width, i.e. the overlay ply 40 is composed of a total of about 138 rows of aligned reinforcing cord sections 41. The interruptions 42 between cord sections are arranged in groups such that the interruptions in about six adjacent rows lie in the same radial plane. The portion of the overlay ply that is illustrated represents about one half of the total ply. In the portion shown each row comprises about two and a half cord sections 41. The cord sections each have a length of about 45 cm which is about 1/5 of the circumference of the tire. For more clarity, the individual cord sections are not shown on FIG. 4, but are illustrated as groups of adjacent cord sections.

Figure 5:
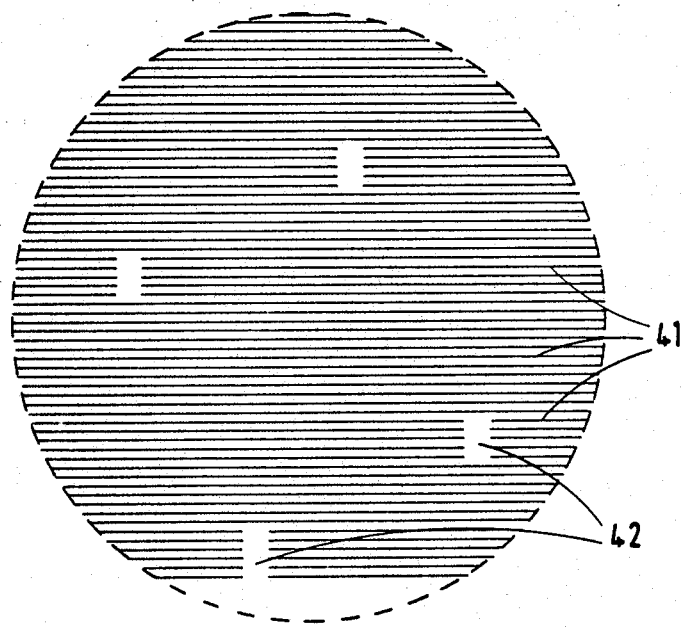
FIG. 5 shows an enlarged view of a portion of the ply of FIG. 4.

FIG. 5 illustrates an enlarged view of the portion of the ply of FIG. 4 that is encircled. The individual cord sections 41 and the interruptions 42 between cord sections 41 can be clearly seen. For simplicity of illustration, the cord sections are shown as lines.

Applicants have discovered that a compromise can be reached between the conflicting requirements of high uniformity and high speed durability by providing cord sections which have lengths of between $\frac{1}{4}$ and $\frac{1}{8}$ of the corresponding circumferential development of the tire. If the cord sections are longer than $\frac{1}{4}$ of the corresponding circumferential development of the tire a reduction in tire uniformity is observed. On the other hand if the cord sections are shorter than $\frac{1}{8}$ of the corresponding circumferential development of the tire, a reduction in the tire's high speed durability is observed. This becomes apparent from the graphs of FIG. 6 and FIG. 7. On the graphs of FIG. 6 and FIG. 7 the abscissas correspond to the lengths of the cord sections of the overlay ply which, according to test results, varied between 1 and 1/13 of the corresponding circumferential development of the tire.

Figure 6:
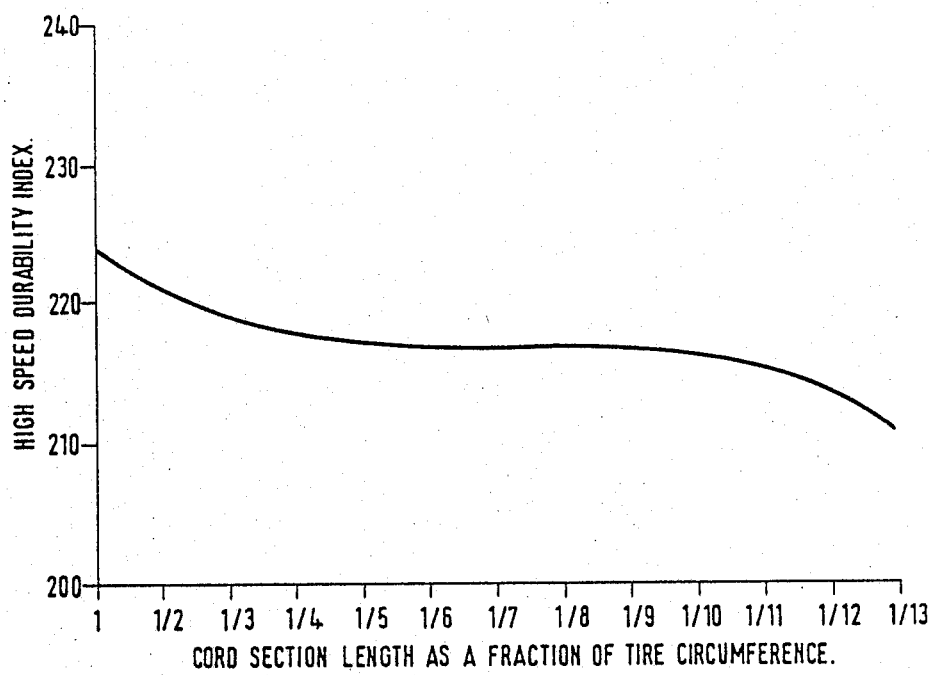
FIG. 6 is a graph illustrating the relationship of cord section length to high speed durability.

The ordinates of the graph of FIG. 6 illustrate the high speed endurance of the tires on test by means of a high speed durability index. A conventional high speed endurance test for a tire consists of subjecting the tire to revolution speeds that gradually increase by steps of 10 km/h. The tire which is inflated to its design pressure is pressed against a drum with a force equivalent to its design load and the tire is then revolved with the drum for ten minutes at each of a series of increasing speed steps. The tire's high speed endurance is measured by the highest speed step that it can sustain during a given interval without being destroyed. The results of this test have been converted to a high speed durability index which is plotted on FIG. 6. As a reference, a tire without overlay ply has on this scale a high speed durability index of 203.

From the "quadratic" regression line shown in FIG. 6, it is apparent that the high speed performance of the tires decreases with a decrease in the length of the overlay cord sections. While the high speed durability index decreases with the cord lengths decreasing from 1 to 1/5, it remains substantially constant for cord lengths comprised between 1/5 and $\frac{1}{8}$ and a further decrease in high speed durability takes place when the cord lengths are smaller than about $\frac{1}{8}$ of the corresponding circumferential development of the tire.

Figure 7:
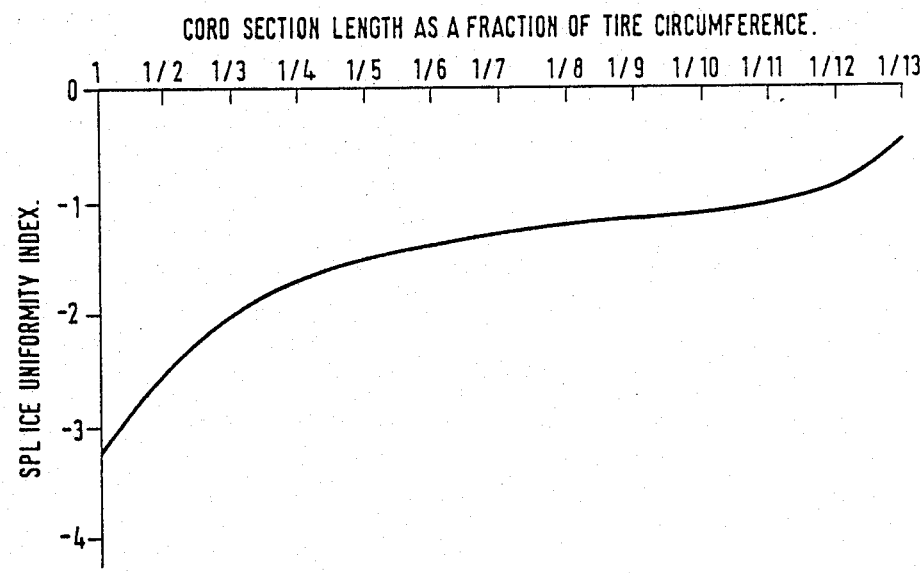
FIG. 7 is a graph illustrating the relationship of cord section length to tire uniformity.

FIG. 7 illustrates the influence of the length of the cord sections on the uniformity of the tire. As explained above, in the introduction to the specification, the higher the slippage at the overlay splice, the higher the chance of the underlying belts being distorted and the higher the chance of the uniformity of the tire being affected. Hence the slippage at the overlay splice can serve as a measure of the tire splice uniformity. The splice slippage measurements have been converted into a splice uniformity index which is shown in FIG. 7.

The "quadratic" regression line that is plotted on FIG. 7 shows that the splice uniformity decreases with increasing cord section lengths and that a substantial decrease in splice uniformity occurs when the length of the overlay cord sections increases to more than about $\frac{1}{4}$ of the corresponding circumferential development of the tire. As a reference, a tire in which no splice slippage occurs on this scale has an index of 0.

While the invention has been described in terms of an overlay ply comprising a single layer of textile reinforcing cords, it equally applies to tires comprising overlay plies with more than one layer of textile reinforcing cords, such as overlay plies comprising two separate axially spaced apart ply portions. Such ply portions can either be disposed radially outwardly of the edges of the radially outermost belt ply or they can be radially interposed between the belt plies at the edges thereof.

Finally, the invention also applies to tires comprising multiple, superposed layers of textile reinforcing cords. It is indeed well known in the tire art that the high speed durability of tires can be further increased by superposing more than one reinforcing layer in the crown area of the tire.

I claim:

1. A pneumatic tire comprising a radial ply carcass, a tread disposed radially outwardly of the crown region of the carcass, a belt assembly interposed between the tread and the crown region of the carcass in circumferential surrounding relation to the carcass, whereby the belt assembly includes at least two plies each of which comprises cords of high modulus material extending parallel to one another, and making opposed angles with respect to the mid-circumferential plane of the tire, whereby each of the belt plies has a respective width approximately equal to that of the tread, and disposed radially outwardly of the belt assembly is an overlay ply comprising at least one layer of textile reinforcing elements which are substantially parallel to one another and to the mid-circumferential plane of the tire, the textile reinforcing elements of the overlay ply comprising successively aligned cord sections arranged in parallel rows each having a length in the range of between $\frac{1}{4}$ and $\frac{1}{8}$ of the corresponding circumferential development of the tire, the cord sections in each row having substantially equal length, and being separated circumferential interruptions having a width such that the total width of the interruptions per circumferentially extending row of cords is less than 4% of the corresponding circumferential development of the tire.

2. A pneumatic tire according to claim 1 wherein the interruptions are disposed around the circumference of the tire such that the interruptions which lie in any particular radial plane of the tire occupy a width which is less than about 10% of the width of the overlay ply.

3. A pneumatic tire according to claim 1 wherein the lengths of the cord sections vary across the width of the overlay ply.

4. A pneumatic tire according to claim 2 wherein the lengths of the cord sections vary across the width of the overlay ply.

5. A pneumatic tire according to claim 3 wherein the lengths of the cord sections increase as the distance of the rows from the mid-circumferential plane increases.

6. A pneumatic tire according to any one of claims 1 to 5 wherein the overlay ply is a single ply which is interposed between the radially outermost belt ply and the tread, said overlay ply having a width which is at least equal to that of the widest belt ply.

7. A pneumatic tire according to any one of claims 1 to 5 wherein the overlay ply comprises two axially spaced apart ply portions, one of which is disposed radially outwardly of each of the edges of the radially outermost belt ply.

8. A pneumatic tire according to any one of claims 1 to 5 wherein the overlay ply comprises two axially spaced apart ply portions each of which is radially interposed between two belt plies at the edges thereof.

9. A pneumatic tire according to any one of claims 1 to 5 wherein the overlay ply comprises multiple, radially superposed layers of textile cords.

10. A pneumatic tire according to any one of claims 1 to 5 wherein the textile reinforcing elements of the overlay ply have a load capacity which is greater than 20 Newtons at 4% elongation.

11. A pneumatic tire according to any one of claims 1 to 5 wherein the textile reinforcing elements of the overlay ply comprise nylon.

* * * * *